Sept. 23, 1924.                A. MEYER                1,509,437
                        AGRICULTURAL IMPLEMENT
                         Filed Nov. 26, 1923
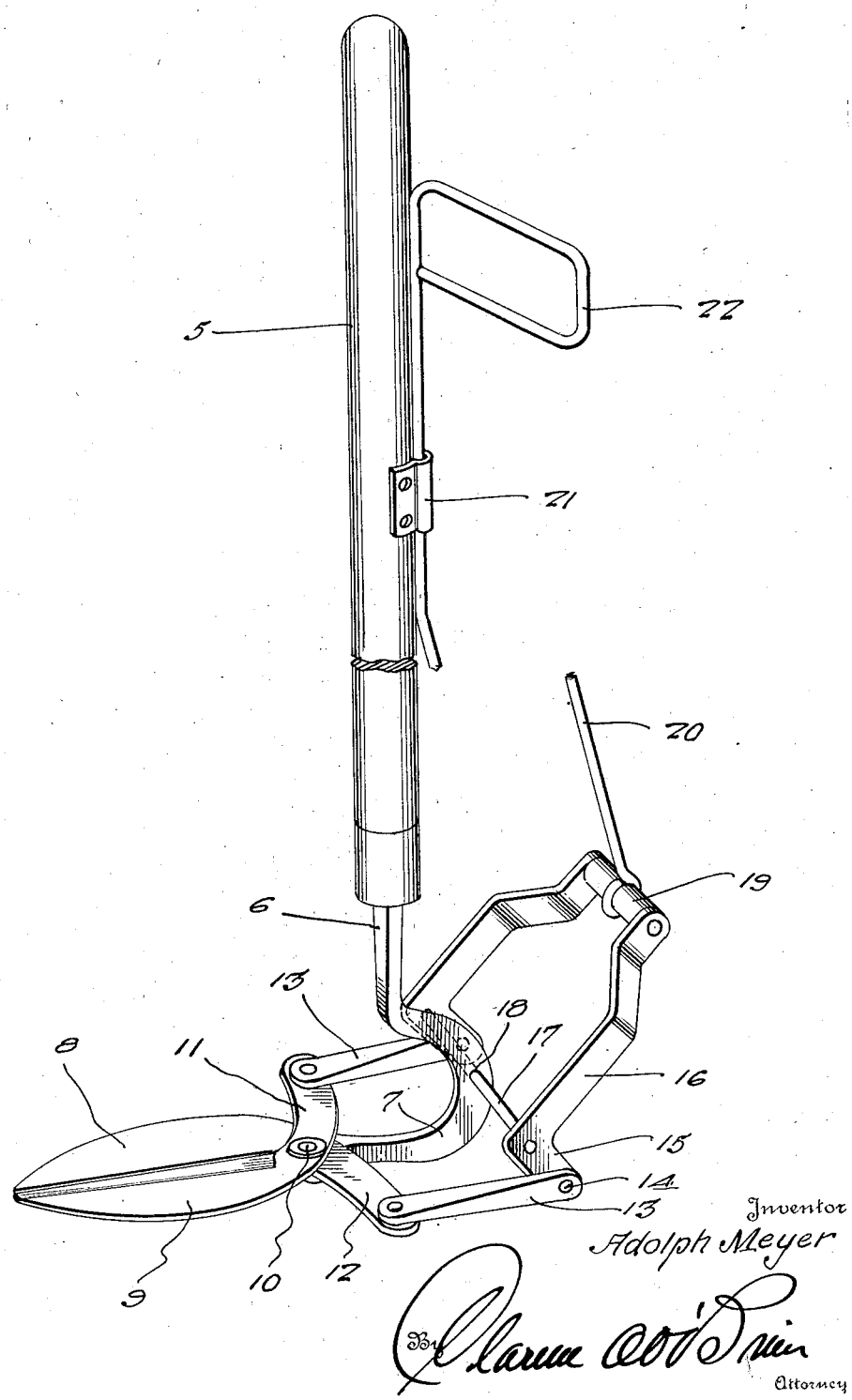
Inventor
Adolph Meyer
By Clarence O'Brien
Attorney Patented Sept. 23, 1924.

1,509,437

UNITED STATES PATENT OFFICE.

ADOLPH MEYER, OF NEWAYGO, MICHIGAN.

AGRICULTURAL IMPLEMENT.

Application filed November 26, 1923. Serial No. 677,126.

*To all whom it may concern:*

Be it known that I, ADOLPH MEYER, citizen of the United States, residing at Newaygo, in the county of Newaygo and State of Michigan, have invented certain new and useful Improvements in Agricultural Implements, of which the following is a specification.

This invention relates to agricultural implements, and has particular reference to an improved clamp device for enabling a person to expeditiously and effectively pull bean vines, cut down plant stalks or the like, without assuming stooping position.

The primary object of the invention is to provide a device of this kind, which will be extremely simple and durable in construction, and which can be readily and easily manipulated without requiring special skill or necessitating the operator assuming a stooping position.

Other objects will appear as the nature of the invention is better understood, and the same consists in the novel form, combination, and arrangement of parts hereinafter more fully described, shown in the accompanying drawing and claimed.

In the drawing, the view is one in perspective and partly broken away of an implement constructed in accordance with the present invention.

Referring more in detail to the drawing, the invention consists of a straight relatively long handle 5 that is adapted to be held in a vertical position as shown, when in use, and that has a suitable shank 6 fixed in one end thereof, which shank has its lower end portion formed to provide a hook shaped element 7 that is vertically disposed. The device further embodies a pair of jaw members 8 and 9 that are pivotally connected to each other and to the free end of the hook member 7 as at 10, said jaws having arms 11 and 12 rigid with the rear ends thereof which cross at the pivot 10 and extend laterally in opposite directions. Pivoted to the outer end of each of the arms 11 and 12 is the forward end of a link 13, the rear end of which is pivotally attached as at 14 to the depending arm 15 of a bell crank lever 16. The bell crank levers 16 are fixed upon the end of a shaft 17 that is horizontally disposed and extended through a central transverse opening provided in the hook member 7 as at 18, and the upper ends of the upper arms of the bell crank lever are rigidly connected by a cross bar 19, on which is pivoted the lower end of an operating rod 20. The rod 20 extends upwardly alongside the handle 5 and is slidably associated with the latter by means of a guide 21 fixed to the handle, and said rod 20 further terminates at its upper end in a loop or handle 22 that is positioned adjacent the upper end of the handle 5.

When the device is employed for cutting stalks of plants, the adjacent edges of the jaws 8 and 9 may be sharpened, while, when the device is employed for pulling bean vines so as to uproot the latter, said jaws may be provided with adjacent gripping faces.

In operation, the rod 20 is forceed downwardly, so as to separate the jaws 8 and 9 through the operation of the bell crank levers and links, thereby allowing the stalks of the plants to pass between the jaws. The jaws are thus positioned adjacent the ground by the operator who grasps the upper end of the handle 5 without stooping, whereupon an upward pull is exerted upon the rod 20, so as to cause the jaws 8 and 9 to swing toward each other, into gripping engagement with the plant stalks. An upward pull is then imparted to the handle 5, so as to cause the plant to be uprooted. When using the device to cut stalks of plants, the operation is the same, except that the movement of the jaws 8 and 9 toward each other affects the cutting operation and no upward pull is necessary.

From the above description, it is believed that the construction and operation, as well as the advantages of the present invention will be readily understood and appreciated by those skilled in the art.

What I claim as new is:

An agricultural implement of the character described comprising a vertical elongated handle having a shank fixed to the lower end thereof, said shank terminating in a horizontal forwardly directed end portion, a pair of jaws projecting forwardly from the free end of the shank and having their rear ends pivoted together and upon the free end portion of the shank, said jaws having crossed arms extending rearwardly and laterally in opposite directions from the pivotal connection of the jaw, rearwardly extended links connected to the outer ends of the arms, vertically swinging bell crank levers pivotally mounted upon the shank rearwardly of the jaws, and a vertically movable operating rod slidably attached to the handle, and pivotally connected at its lower end to the upper ends of the bell crank levers.

In testimony whereof I affix my signature

ADOLPH MEYER.